US010211442B2

(12) United States Patent
Arise et al.

(10) Patent No.: US 10,211,442 B2
(45) Date of Patent: Feb. 19, 2019

(54) NONAQUEOUS ELECTROLYTE SECONDARY BATTERY INSULATING POROUS LAYER AND NONAQUEOUS ELECTROLYTE SECONDARY BATTERY LAMINATED SEPARATOR

(71) Applicant: Sumitomo Chemical Company, Limited, Tokyo (JP)

(72) Inventors: Ichiro Arise, Osaka (JP); Chikara Murakami, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/357,563

(22) Filed: Nov. 21, 2016

(65) Prior Publication Data

US 2017/0155117 A1    Jun. 1, 2017

(30) Foreign Application Priority Data

Nov. 27, 2015    (JP) .................................. 2015-232153

(51) Int. Cl.
    H01M 2/16        (2006.01)
    H01M 10/0525    (2010.01)

(52) U.S. Cl.
    CPC ......... H01M 2/1686 (2013.01); H01M 2/166 (2013.01); H01M 2/1646 (2013.01); H01M 2/1653 (2013.01); H01M 10/0525 (2013.01)

(58) Field of Classification Search
    None
    See application file for complete search history.

(56) References Cited

U.S. PATENT DOCUMENTS

| | | | |
|---|---|---|---|
| 4,781,263 A | 11/1988 | Eto et al. | |
| 6,627,346 B1 | 9/2003 | Kinouchi et al. | |
| 2002/0160207 A1 | 10/2002 | Kohmura et al. | |
| 2004/0166407 A1 | 8/2004 | Nakajima et al. | |
| 2006/0008700 A1 | 1/2006 | Yong et al. | |
| 2006/0040110 A1 | 2/2006 | Kohmura et al. | |
| 2008/0070107 A1 | 3/2008 | Kasamatsu et al. | |
| 2008/0193845 A1 | 8/2008 | Muraoka et al. | |
| 2009/0111025 A1 | 4/2009 | Lee et al. | |
| 2009/0274954 A1 | 11/2009 | Sato et al. | |
| 2010/0221965 A1 | 9/2010 | Katayama et al. | |
| 2010/0316903 A1 | 12/2010 | Kim et al. | |
| 2011/0052962 A1 | 3/2011 | Suzuki et al. | |
| 2011/0195294 A1 | 8/2011 | Lee et al. | |
| 2013/0280583 A1 | 10/2013 | Lee et al. | |
| 2014/0113173 A1* | 4/2014 | Honda | H01G 11/52 429/144 |
| 2014/0302389 A1 | 10/2014 | Hasegawa et al. | |
| 2015/0236318 A1 | 8/2015 | Katayama et al. | |

FOREIGN PATENT DOCUMENTS

| | | |
|---|---|---|
| CN | 101796669 A | 8/2010 |
| JP | 2002025531 A | 1/2002 |
| JP | 2002293529 A | 10/2002 |
| JP | 2004273437 A | 9/2004 |
| JP | 2004292304 A | 10/2004 |
| JP | 2008503049 A | 1/2008 |
| JP | 2008198506 A | 8/2008 |
| JP | 2011505663 A | 2/2011 |
| JP | 201435832 A | 2/2014 |
| JP | 5460962 B2 | 4/2014 |
| JP | 5569515 B2 | 8/2014 |
| JP | 2014530472 A | 11/2014 |
| JP | 5655088 B2 | 1/2015 |
| JP | 2015201389 A | 11/2015 |
| KR | 20080015011 A | 2/2008 |
| KR | 20100126394 A | 12/2010 |
| KR | 20140102650 A | 8/2014 |
| KR | 20150110297 A | 10/2015 |
| KR | 20150116287 A | 10/2015 |
| WO | 2006061936 A1 | 6/2006 |
| WO | 2010098380 A1 | 9/2010 |

OTHER PUBLICATIONS

Office Action dated Sep. 5, 2017 in CN Application No. 201611051240.X.
Office Action dated Sep. 13, 2016 in JP Application No. 2016-128157.
Office Action dated Aug. 17, 2016 in KR Application No. 10-2016-0077245.

* cited by examiner

*Primary Examiner* — Ladan Mohaddes
(74) *Attorney, Agent, or Firm* — Panitch Schwarze Belisario & Nadel LLP

(57) ABSTRACT

As a nonaqueous electrolyte secondary battery insulating porous layer and nonaqueous electrolyte secondary battery laminated separator each of which allows a nonaqueous electrolyte secondary battery to have an improved discharge output characteristic, there are provided (i) a nonaqueous electrolyte secondary battery insulating porous layer containing a filler including a metal oxide and having a capacitance of not less than 0.0390 nF and not more than 0.142 nF per 19.6 mm$^2$ and a thickness of not less than 0.1 μm and not more than 20 μm and (ii) a nonaqueous electrolyte secondary battery laminated separator including the porous layer.

15 Claims, No Drawings

NONAQUEOUS ELECTROLYTE SECONDARY BATTERY INSULATING POROUS LAYER AND NONAQUEOUS ELECTROLYTE SECONDARY BATTERY LAMINATED SEPARATOR

This Nonprovisional application claims priority under 35 U.S.C. § 119 on Patent Application No. 2015-232153 filed in Japan on Nov. 27, 2015, the entire contents of which are hereby incorporated by reference.

TECHNICAL FIELD

The present invention relates to an insulating porous layer for a nonaqueous electrolyte secondary battery (hereinafter referred to as "nonaqueous electrolyte secondary battery insulating porous layer") and a laminated separator for a nonaqueous electrolyte secondary battery (hereinafter referred to as "nonaqueous electrolyte secondary battery laminated separator").

BACKGROUND ART

Nonaqueous electrolyte secondary batteries, particularly lithium secondary batteries, have high energy density and are thus in wide use as batteries for personal computers, mobile telephones, portable information terminals, and the like.

Nonaqueous electrolyte secondary batteries, typically lithium secondary batteries, have high energy density. Nonaqueous electrolyte secondary batteries let a large current flow and thus generate intense heat in the event of an accident such as a breakage of the battery or a breakage of the device using the battery has caused an internal short circuit or external short circuit. Nonaqueous electrolyte secondary batteries are thus required to prevent more than a certain level of heat generation to ensure a high level of safety.

Such a high level of safety is ensured typically by a method of imparting to the nonaqueous electrolyte secondary battery a shutdown function, which is a function of a separator blocking passage of ions between the anode and the cathode in the event of abnormal heat generation to prevent further heat generation. The shutdown function may be imparted to a separator by, for example, a method of using, as the separator, a porous film made of a material that is meltable in the event of abnormal heat generation. A battery including such a separator allows the porous film to be melted and made non-porous in the event of abnormal heat generation to block the ion passage for prevention of further heat generation.

A proposed example of a separator having such a shutdown function is a laminated separator including (i) a porous base material and (ii) an active layer (coating layer) that contains a mixture of inorganic fine particles and a binder polymer and that is disposed on the porous base material (Patent Literatures 1 to 3). Another proposed example is a lithium secondary battery electrode including (i) an electrode and (ii) a porous film that contains inorganic fine particles and a binding agent (resin), that is disposed on the electrode, and that is capable of functioning as a separator (Patent Literature 4).

CITATION LIST

Patent Literature

[Patent Literature 1]
Japanese Patent Application Publication (Translation of PCT Application), Tokuhyo, No. 2008-503049 (Publication Date: Jan. 21, 2008)

[Patent Literature 2]
U.S. Pat. No. 5,460,962 (Issue Date: Apr. 2, 2014)
[Patent Literature 3]
U.S. Pat. No. 5,655,088 (Issue Date: Jan. 14, 2015)
[Patent Literature 4]
U.S. Pat. No. 5,569,515 (Issue Date: Aug. 13, 2014)

SUMMARY OF INVENTION

Technical Problem

The above conventional laminated separator or nonaqueous electrolyte secondary battery that includes, integrated therein, an electrode provided with a porous film is unfortunately problematic in terms of an insufficient discharge output characteristic.

Solution to Problem

In order to solve the above problem, the inventors of the present invention have discovered that a nonaqueous electrolyte secondary battery including, integrated therein as a separator, a nonaqueous electrolyte secondary battery insulating porous layer or nonaqueous electrolyte secondary battery laminated separator each including an insulating porous layer containing an inorganic filler will have an improved discharge output characteristic through adjustment of the capacitance of the insulating porous layer within a particular range. The inventors have consequently arrived at the present invention.

Specifically, the present invention is a nonaqueous electrolyte secondary battery insulating porous layer, a nonaqueous electrolyte secondary battery laminated separator, a member for a nonaqueous electrolyte secondary battery (hereinafter referred to as "nonaqueous electrolyte secondary battery member"), and a nonaqueous electrolyte secondary battery each described later.

A nonaqueous electrolyte secondary battery insulating porous layer of an embodiment of the present invention is an insulating porous layer for a nonaqueous electrolyte secondary battery, the insulating porous layer including: a fine metal oxide particle, the insulating porous layer having a capacitance of not less than 0.0390 nF and not more than 0.142 nF per 19.6 mm$^2$ and a thickness of not less than 0.1 µm and not more than 20 µm.

The insulating porous layer of an embodiment of the present invention may preferably be arranged such that the fine metal oxide particle contains titanium oxide, more preferably be arranged such that the fine metal oxide particle contains elemental aluminum and elemental titanium. The insulating porous layer may preferably be arranged such that the fine metal oxide particle contains a metal oxide in a form of a solid solution. The insulating porous layer may preferably be arranged such that the fine metal oxide particle is a ground product. The insulating porous layer may preferably be arranged such that the fine metal oxide particle contains two or more kinds of metal oxides.

A nonaqueous electrolyte secondary battery laminated separator of an embodiment of the present invention is a laminated separator for a nonaqueous electrolyte secondary battery, the laminated separator including: a porous film containing a polyolefin at a proportion of not less than 50% by volume; and an insulating porous layer containing a fine metal oxide particle and disposed on one or both surfaces of the porous film, the insulating porous layer having a thickness of not less than 0.1 µm and not more than 20 µm, the porous film having a thickness of not less than 4 µm and not more than 50 μm, the laminated separator having a capacitance of not less than 0.0145 nF and not more than 0.0230 nF per 19.6 mm².

The laminated separator of an embodiment of the present invention may preferably be arranged such that the laminated separator has a relative dielectric constant of more than 1.70 and not more than 2.60 per 19.6 mm². The laminated separator of an embodiment of the present invention may preferably be arranged such that the porous film has a capacitance of not less than 0.0230 nF and not more than 0.0270 nF per 19.6 mm².

The laminated separator of an embodiment of the present invention may preferably be arranged such that the fine metal oxide particle contains titanium oxide, more preferably be arranged such that the fine metal oxide particle contains elemental aluminum and elemental titanium. The laminated separator of an embodiment of the present invention may preferably be arranged such that the fine metal oxide particle contains a metal oxide in a form of a solid solution. The laminated separator of an embodiment of the present invention may preferably be arranged such that the fine metal oxide particle is a ground product. The laminated separator of an embodiment of the present invention may preferably be arranged such that the fine metal oxide particle contains two or more kinds of metal oxides.

A nonaqueous electrolyte secondary battery member of an embodiment of the present invention may be a nonaqueous electrolyte secondary battery member, including: a cathode; an insulating porous layer according of an embodiment of the present invention; and an anode, the cathode, the insulating porous layer, and the anode being arranged in that order. A nonaqueous electrolyte secondary battery member of an embodiment of the present invention may be a nonaqueous electrolyte secondary battery member, including: a cathode; a laminated separator of an embodiment of the present invention; and an anode, the cathode, the laminated separator, and the anode being arranged in that order.

A nonaqueous electrolyte secondary battery of an embodiment of the present invention may be a nonaqueous electrolyte secondary battery, including: a laminated separator of an embodiment of the present invention; and an electrolyte solution solvent, the laminated separator having a relative dielectric constant having a proportion of not less than 0.0190 and not more than 0.930 with respect to a relative dielectric constant of the electrolyte solution solvent. A nonaqueous electrolyte secondary battery of an embodiment of the present invention may be a nonaqueous electrolyte secondary battery, including an insulating porous layer of an embodiment of the present invention or a laminated separator of an embodiment of the present invention.

Advantageous Effects of Invention

A nonaqueous electrolyte secondary battery insulating porous layer or nonaqueous electrolyte secondary battery laminated separator of an embodiment of the present invention allows a nonaqueous electrolyte secondary battery including the nonaqueous electrolyte secondary battery insulating porous layer or nonaqueous electrolyte secondary battery laminated separator integrated therein as a separator to have an improved discharge output characteristic. Similarly, a nonaqueous electrolyte secondary battery member of an embodiment of the present invention allows a nonaqueous electrolyte secondary battery including the nonaqueous electrolyte secondary battery member integrated therein to have an improved discharge output characteristic. A nonaqueous electrolyte secondary battery of an embodiment of the present invention has a discharge output characteristic superior to those of conventional nonaqueous electrolyte secondary batteries. A nonaqueous electrolyte secondary battery insulating porous layer advantageously allows a nonaqueous electrolyte secondary battery to have an improved discharge output characteristic no matter whether the nonaqueous electrolyte secondary battery insulating porous layer is disposed on a separator base material to form a laminated separator or disposed on an electrode to provide an electrode coating layer serving as a separator by itself.

DESCRIPTION OF EMBODIMENTS

The following description will discuss an embodiment of the present invention in detail. The expression "A to B" in the description below means "not less than A and not more than B".

The present specification uses the symbols shown in Table 1 below to represent the capacitance, relative dielectric constant, dielectric constant, thickness, and area of each of a nonaqueous electrolyte secondary battery laminated separator (hereinafter also referred to simply as "laminated separator"), a nonaqueous electrolyte secondary battery insulating porous layer (hereinafter also referred to simply as "insulating porous layer"), and a porous film. The present specification also uses the symbols shown in Table 1 below to represent the dielectric constant of a vacuum.

TABLE 1

|  | Capacitance | Relative dielectric constant | Dielectric constant | Thickness | Area | Capacitance calculation formula |
|---|---|---|---|---|---|---|
| Laminated separator | $C_0$ | $\varepsilon r_0$ | $\varepsilon_0$ | $d_0$ | $S_0$ | $C_0 = \varepsilon * \varepsilon r_0 * S_0 / d_0$ |
| Porous layer | $C_1$ | $\varepsilon r_1$ | $\varepsilon_1$ | $d_1$ | $S_1$ | $C_1 = \varepsilon * \varepsilon r_1 * S_1 / d_1$ |
| Porous film | $C_2$ | $\varepsilon r_2$ | $\varepsilon_2$ | $d_2$ | $S_2$ | $C_2 = \varepsilon * \varepsilon r_2 * S_2 / d_2$ |
| Vacuum |  |  | $\varepsilon$ |  |  |  |

The above physical quantities such as the capacitance are as measured in a given area, hence $S_0 = S_1 = S_2$. The present specification also refers to such an area simply as "S".

[Embodiment 1: Nonaqueous Electrolyte Secondary Battery Insulating Porous Layer and Embodiment 2: Nonaqueous Electrolyte Secondary Battery Laminated Separator]

Embodiment 1 of the present invention is a nonaqueous electrolyte secondary battery insulating porous layer containing fine metal oxide particles and having a capacitance per 19.6 mm² of not less than 0.0390 nF and not more than 0.142 nF, preferably not less than 0.0440 nF and not more than 0.140 nF, more preferably not less than 0.0440 nF and not more than 0.135 nF. Further, the nonaqueous electrolyte secondary battery insulating porous layer of Embodiment 1 of the present invention has a thickness of not less than 0.1 μm and not more than 20 μm.

The nonaqueous electrolyte secondary battery insulating porous layer (insulating porous layer) has a capacitance $C_1$ that can be calculated on the basis of Formula (1) below, $$C_1 = \in * \in_{r_1} * S_1 / d_1 \qquad (1),$$

where $\in (=8.854*10^{-12}(F/m))$ represents the dielectric constant of a vacuum, $\in_{r_1}$ represents the relative dielectric constant of the insulating porous layer, $S_1$ represents the area thereof, and $d_1$ represents the thickness thereof. This means that the capacitance over a given area S (19.6 mm$^2$) of the insulating porous layer can be adjusted by appropriately adjusting the relative dielectric constant ($\in_{r_1}$) and thickness ($d_1$) of that insulating porous layer.

The relative dielectric constant refers to the ratio between the dielectric constant $\in_1$ of a separator and the dielectric constant $\in$ of a vacuum, and is represented by $\in_{r_1} = \in_1 / \in$.

The nonaqueous electrolyte secondary battery insulating porous layer has a thickness of not less than 0.1 μm and not more than 20 μm, preferably not less than 2 μm and not more than 15 μm. An excessively large thickness (more than 20 μm) of the insulating porous layer will lead to an increase in the internal resistance of a nonaqueous electrolyte secondary battery including the insulating porous layer and thus to degradation in battery characteristics (for example, output characteristic) of the nonaqueous electrolyte secondary battery. An excessively small thickness (less than 0.1 μm) of the insulating porous layer will lead to a decrease in the insulation and voltage leak resistance of the insulating porous layer. Further, with the insulating porous layer having an excessively small thickness, in a case where the insulating porous layer is disposed on a polyolefin porous film for use as a nonaqueous electrolyte secondary battery laminated separator member, abnormal heat generation in a nonaqueous electrolyte secondary battery including that laminated separator may result in the laminated separator contracting as the laminated separator becomes unable to withstand thermal contraction of the polyolefin porous film. In a case where the insulating porous layer is disposed on both surfaces of the porous film (polyolefin porous film), the respective thicknesses of the two layers are combined to mean the "thickness of the insulating porous layer".

A nonaqueous electrolyte secondary battery functions such that cations (for example, Li$^+$ in the case of a lithium ion secondary battery) solvated with the electrolyte solution solvent pass through the separator (namely, a nonaqueous electrolyte secondary battery insulating porous layer or an insulating porous layer as a member of a nonaqueous electrolyte secondary battery laminated separator), are desolvated, and are then inserted into the cathode. Since the desolvation process is a factor in the internal resistance of the nonaqueous electrolyte secondary battery, accelerating the desolvation can reduce the internal resistance of the nonaqueous electrolyte secondary battery and improve the output characteristic of the battery.

The likelihood of desolvation is influenced by the polarization (which depends on the relative dielectric constant, or capacitance) of a component of the insulating porous layer: A higher polarization accelerates desolvation. An excessively high polarization of the insulating porous layer will, however, lead to excessive desolvation, thereby letting cations be influenced by the polarization after desolvation and preventing those cations from moving to the cathode. This contrarily results in an increase in the internal resistance of the nonaqueous electrolyte secondary battery. Adjusting the capacitance of the insulating porous layer within a moderate range can thus improve the output characteristic of the nonaqueous electrolyte secondary battery.

Specifically, an insulating porous layer having a capacitance of less than 0.0390 nF per 19.6 mm$^2$ will have a low polarization capability and contribute little to the desolvation. A nonaqueous electrolyte secondary battery including such an insulating porous layer integrated therein as a separator or a separator member will thus not have an improved output characteristic. On the other hand, an insulating porous layer having a capacitance of more than 0.142 nF per 19.6 mm$^2$ will have an excessively high polarization capability, leading to excessive desolvation, with the result of desolvation of cations, which means that the solvent for the movement of the cations through the insulating porous layer is removed from the cations. Such an excessively high polarization capability will also lead to an excessively high affinity between the inner walls of the voids of the insulating porous layer and the desolvated cations (for example, Li$^+$) and thus prevent those cations (for example, Li$^+$) from moving through the insulating porous layer. A nonaqueous electrolyte secondary battery including such an insulating porous layer integrated therein as a separator or a separator member will thus have a contrarily decreased output characteristic.

Embodiment 2 of the present invention is a nonaqueous electrolyte secondary battery laminated separator including (i) a porous film containing a polyolefin at a proportion of not less than 50% by volume and (ii) an insulating porous layer containing fine metal oxide particles and disposed on one or both surfaces of the porous film, the laminated separator having a capacitance per 19.6 mm$^2$ of not less than 0.0145 nF and not more than 0.0230 nF, preferably not less than 0.0150 nF and not more than 0.0225 nF, more preferably not less than 0.0155 nF and not more than 0.0220 nF. Further, the nonaqueous electrolyte secondary battery laminated separator of Embodiment 2 of the present invention is arranged such that the insulating porous layer has a thickness of not less than 0.1 μm and not more than 20 μm and that the porous film has a thickness of not less than 4 μm and not more than 50 μm. In addition, the nonaqueous electrolyte secondary battery laminated separator preferably includes (i) a porous film containing a polyolefin at a proportion of not less than 50% by volume and (ii) the nonaqueous electrolyte secondary battery insulating porous layer as Embodiment 1 of the present invention disposed on one or both surfaces of the porous film.

Similarly to the nonaqueous electrolyte secondary battery insulating porous layer of an embodiment of the present invention, the nonaqueous electrolyte secondary battery laminated separator has a capacitance $C_0$ that can be calculated on the basis of Formula (2) below, $$C_0 = \in * \in_{r_0} * S_0 / d_0 \qquad (2),$$

where $\in (=8.854*10^{-12}(F/m))$ represents the dielectric constant of a vacuum, $\in_{r_0}$ represents the relative dielectric constant of the nonaqueous electrolyte secondary battery laminated separator, $S_0$ represents the area thereof, and $d_0$ represents the thickness thereof.

The porous film of the nonaqueous electrolyte secondary battery laminated separator has a capacitance $C_2$ that can similarly be calculated on the basis of Formula (3) below, $$C_2 = \in * \in_{r_2} * S_2 / d_2 \qquad (3),$$

where $\in (=8.854*10^{-12}(F/m))$ represents the dielectric constant of a vacuum, $\in_{r_2}$ represents the relative dielectric constant of the porous film, $S_2$ represents the area thereof, and $d_2$ represents the thickness thereof.

The nonaqueous electrolyte secondary battery laminated separator of an embodiment of the present invention has an extremely thin interface between the porous film and the insulating porous layer. This should indicate that the interface makes only an ignorably small contribution to the capacitance of the entire nonaqueous electrolyte secondary battery laminated separator. The capacitance $C_0$, the capacitance $C_1$, and the capacitance $C_2$ thus have a relation indicated by Formula (4) below, $$1/C_0 = (1/C_1) + (1/C_2) \qquad (4).$$

The above description shows that the nonaqueous electrolyte secondary battery laminated separator of an embodiment of the present invention has a capacitance over a given area (19.6 mm$^2$) which capacitance can be adjusted through adjustment of the relative dielectric constant ($\in r_1$ or $\in r_2$) and thickness ($d_1$ or $d_2$) of each of the insulating porous layer and porous film each included in the nonaqueous electrolyte secondary battery laminated separator. The relative dielectric constant of each of the insulating porous layer and the porous film can be adjusted by changing the shape of the insulating porous layer or void, the porosity, and the distribution of the void, since air has a relative dielectric constant of 1.

Embodiment 2 of the present invention is a nonaqueous electrolyte secondary battery laminated separator having a relative dielectric constant of preferably not less than 1.65 and not more than 2.55, more preferably not less than 1.75 and not more than 2.60, further preferably not less than 1.80 and not more than 2.60.

The nonaqueous electrolyte secondary battery laminated separator in accordance with Embodiment 2 of the present invention has a thickness normally within a range of 5 μm to 80 μm, preferably within a range of 5 μm to 50 μm, particularly preferably within a range of 6 μm to 35 μm. A separator as a whole having a thickness of less than 5 μm will easily break. On the other hand, in a case where the nonaqueous electrolyte secondary battery laminated separator has a thickness of more than 80 μm, a nonaqueous electrolyte secondary battery including the separator will have an increased internal resistance and suffer from degradation in battery characteristics (for example, output characteristic). Further, in a case where the battery has a small internal capacity, the battery will need to have a reduced electrode amount, with the result of the battery having a small capacity.

The nonaqueous electrolyte secondary battery laminated separator in accordance with Embodiment 2 of the present invention, which has a capacitance and relative dielectric constant each within the above range, produces effects similar to those produced as above by the nonaqueous electrolyte secondary battery insulating porous layer in accordance with Embodiment 1 of the present invention. Specifically, the nonaqueous electrolyte secondary battery laminated separator of an embodiment of the present invention can moderately adjust the progress of desolvation of cations (for example, Li$^+$) in a nonaqueous electrolyte secondary battery including the nonaqueous electrolyte secondary battery laminated separator integrated therein, and consequently allows the nonaqueous electrolyte secondary battery to have an improved output characteristic.

The following description will discuss individual members of a nonaqueous electrolyte secondary battery insulating porous layer and nonaqueous electrolyte secondary battery laminated separator of an embodiment of the present invention in detail.

[Insulating Porous Layer]

The nonaqueous electrolyte secondary battery insulating porous layer (insulating porous layer) of an embodiment of the present invention can, for example, be used alone as a separator for a nonaqueous electrolyte secondary battery (hereinafter referred to as a "nonaqueous electrolyte secondary battery separator") in the form of an electrode coating layer or be disposed on a porous film described later for use as a member of a nonaqueous electrolyte secondary battery laminated separator.

The fine metal oxide particles contained in the nonaqueous electrolyte secondary battery insulating porous layer of an embodiment of the present invention are made of a metal oxide. The nonaqueous electrolyte secondary battery insulating porous layer may contain (i) only one kind of fine metal oxide particles or (ii) a combination of two or more kinds of fine metal oxide particles which kinds differ from each other in terms of the particle diameter and specific surface area.

The fine metal oxide particles each have a shape that varies depending on, for example, (i) the method for producing the metal oxide as a raw material and (ii) the condition under which the fine metal oxide particles are dispersed when a coating solution (described later) for forming an insulating porous layer is prepared. The fine metal oxide particles may each have any of various shapes such as a spherical shape, an oblong shape, a rectangular shape, a gourd shape, or an indefinite, irregular shape.

The fine metal oxide particles have a volume-based particle size distribution having two peak tops, namely a first peak top and a second peak top. The fine metal oxide particles are preferably arranged such that (i) the first peak top corresponds to a particle size of not less than 0.4 μm and not more than 0.6 μm and that (ii) the second peak top corresponds to a particle size of not less than 5 μm and not more than 7 μm. The fine metal oxide particles are more desirably arranged such that in addition, the first peak top has a cumulative distribution (minus sieve) of not less than 10% and not more than 20% and that the second peak top has a cumulative distribution (minus sieve) of not less than 60% and not more than 80%.

The fine metal oxide particles are preferably a ground product, more preferably a ground product having an average particle diameter and particle size distribution each within the above range. The fine metal oxide particles can be prepared as a ground product by wet grinding or dry grinding. Specific examples of the method for preparing the ground product include, but are not limited to, a method of grinding a coarse filler in, for example, a high-speed rotation mill, a tumbling mill, a vibrating mill, a planetary mill, a medium stirring mill, or an airflow crusher. The method is, among the above examples, preferably dry grinding that involves no disperse medium, more preferably dry grinding that further involves a device which uses a grinding medium such as a bead mill or a vibratory ball mill, particularly preferably the grinding medium additionally having a Mohs' hardness not lower than the Mohs' hardness of the metal oxide. A specific example of the grinding method is a medialess grinding method, which does not cause a collision between ceramic particles and a medium, as disclosed in, for example, U.S. Pat. No. 4,781,263, which describes a method that combines a jet stream and high-speed shearing that uses a rotary blade.

The fine metal oxide particles may be made of any metal oxide. Examples of the metal oxide include titanium oxide, alumina, boehmite (alumina monohydrate), zirconia, silica, magnesia, calcium oxide, barium oxide, boron oxide, and zinc oxide. The metal oxide may be made of only one kind of metal oxide, but are preferably made of two or more kinds of metal oxides. Further, the oxide may be a complex oxide.

The complex oxide preferably contains as a constituent metallic element at least one element selected from elemental aluminum, elemental titanium, elemental zirconium, elemental silicon, elemental boron, elemental magnesium, elemental calcium, and elemental barium, further preferably elemental aluminum and elemental titanium, particularly preferably a titanium oxide. In addition, the fine metal oxide particles preferably contain a metal oxide in the form of a solid solution, more preferably containing only a metal oxide in the form of a solid solution. Specifically, the fine metal oxide particles are particularly preferably made of respective solid solutions of alumina and titania.

The insulating porous layer of an embodiment of the present invention is normally a resin layer containing not only a filler made of a metal oxide but also a resin as a binder. The insulating porous layer contains a resin that is preferably (i) insoluble in the electrolyte solution of the battery and (ii) electrochemically stable when the battery is in normal use.

Specific examples of the resin include polyolefins such as polyethylene, polypropylene, polybutene, and ethylene-propylene copolymer; fluorine-containing resins such as a vinylidene fluoride homopolymer (polyvinylidene fluoride), a vinylidene fluoride copolymer (for example, a vinylidene fluoride-hexafluoro propylene copolymer and a vinylidene fluoride-hexafluoro propylene-tetrafluoroethylene copolymer), and a tetrafluoroethylene copolymer (for example, an ethylene-tetrafluoroethylene copolymer); fluorine-containing rubbers having a glass transition temperature of not higher than 23° C. among the above fluorine-containing resins; aromatic polyamides; fully aromatic polyamides (aramid resins); rubbers such as styrene-butadiene copolymer and a hydride thereof, methacrylic acid ester copolymer, acrylonitrile-acrylic acid ester copolymer, styrene-acrylic acid ester copolymer, ethylene propylene rubber, and polyvinyl acetate; resins with a melting point or glass transition temperature of not lower than 180° C. such as polyphenylene ether, polysulfone, polyether sulfone, polyphenylene sulfide, polyetherimide, polyamide imide, polyetheramide, and polyester; and water-soluble polymers such as polyvinyl alcohol, polyethyleneglycol, cellulose ether, sodium alginate, polyacrylic acid, polyacrylamide, and polymethacrylic acid.

The resin contained in the insulating porous layer in accordance with of an embodiment of the present invention may suitably be a water-insoluble polymer as well. Stated differently, the insulating porous layer in accordance with an embodiment of the present invention may also preferably be produced with use of an emulsion or dispersion containing a water-insoluble polymer (for example, an acrylate resin) dispersed in an aqueous solvent. This allows the insulating porous layer in accordance with an embodiment of the present invention to contain the water-insoluble polymer as the resin.

The water-insoluble polymer is not dissolved in the aqueous solvent, but dispersed in the aqueous solvent in the form of particles. A water-insoluble polymer is defined as follows: In a case where 0.5 g of the polymer is dissolved in 100 g of water at 25° C., the insoluble component is not less than 90 weight %. A water-soluble polymer is, on the other hand, defined as follows: In a case where 0.5 g of the polymer is dissolved in 100 g of water at 25° C., the insoluble component is less than 0.5 weight %. The particles of the water-insoluble polymer are not limited to any particular shape, but desirably have a spherical shape.

A water-insoluble polymer is produced by, for example, polymerizing in an aqueous solvent a monomer composition containing a monomer described below to produce a polymer in the form of particles.

Examples of a monomer for the water-insoluble polymer include styrene, vinyl ketone, acrylonitrile, methyl methacrylate, ethyl methacrylate, glycidyl methacrylate, glycidyl acrylate, methyl acrylate, acrylic acid ethyl, and acrylic acid butyl.

The polymer in the form of particles may be not only a homopolymer of a monomer, but also a copolymer of two or more monomers. Examples of the polymer include fluorine-containing resins such as polyvinylidene fluoride, a vinylidene fluoride copolymer (for example, a vinylidene fluoride-hexafluoro propylene copolymer and a vinylidene fluoride-hexafluoro propylene-tetrafluoroethylene copolymer), and a tetrafluoroethylene copolymer (for example, an ethylene-tetrafluoroethylene copolymer); melamine resin; urea resin; polyethylene; polypropylene; polymethyl acrylate; polymethyl methacrylate; and polyacrylic acid butyl.

The aqueous solvent may be any aqueous solvent that contains water as a main component and that allows the water-insoluble polymer particles to be dispersed. The aqueous solvent may contain any amount of an organic solvent that can be mixed with water at any ratio. Examples of the organic solvent include methanol, ethanol, isopropyl alcohol, acetone, tetrahydrofuran, acetonitrile, and N-methylpyrrolidone. The aqueous solvent may further contain, for example, an additive such as (i) a surface active agent such as sodium dodecylbenzenesulfonate or (ii) a dispersing agent such as a sodium salt of polyacrylic acid or carboxymethyl cellulose. The aqueous solvent may contain only one kind of organic solvent or a mixture of two or more kinds of organic solvents. The aqueous solvent may contain only one kind of additive or a mixture of two or more kinds of additives. In a case where the aqueous solvent contains an organic solvent, the organic solvent is contained at a weight proportion of 0.1 weight % to 99 weight %, preferably 0.5 weight % to 80 weight %, further preferably 1 weight % to 50 weight %, with respect to water with the total of the weight of the organic solvent and the weight of the water being 100 weight %.

The insulating porous layer in accordance with an embodiment of the present invention may contain one kind of resin or a mixture of two or more kinds of resins.

Specific examples of the aromatic polyamides include poly(paraphenylene terephthalamide), poly(methaphenylene isophthalamide), poly(parabenzamide), poly(methabenzamide), poly(4,4'-benzanilide terephthalamide), poly(paraphenylene-4,4'-biphenylene dicarboxamide), poly(methaphenylene-4,4'-biphenylene dicarboxamide), poly(paraphenylene-2,6-naphthalene dicarboxamide), poly(methaphenylene-2,6-naphthalene dicarboxamide), poly(2-chloroparaphenylene terephthalamide), paraphenylene terephthalamide/2,6-dichloroparaphenylene terephthalamide copolymer, and methaphenylene terephthalamide/2,6-dichloroparaphenylene terephthalamide copolymer. Among these, poly(paraphenylene terephthalamide) is preferable.

The resin is more preferably polyolefin, a fluorine-containing resin, a fluorine-containing rubber, aromatic polyamide, water-soluble polymer, or a water-insoluble polymer in the form of particles dispersed in an aqueous solvent. The resin is particularly preferably a fluorine-containing resin because in a case where the insulating porous layer is used as a separator of a nonaqueous electrolyte solution secondary battery or a member of a nonaqueous electrolyte solution secondary battery laminated separator, the nonaqueous electrolyte secondary battery can easily maintain various performance capabilities such as the rate characteristic and resistance characteristic (solution resistance) even in a case where the battery is oxidatively degraded through its charging and discharging. The resin is more preferably a water-soluble polymer or a water-insoluble polymer in the form of particles dispersed in an aqueous solvent in terms of the process and environmental burden because in such a case, water can be used as a solvent for forming an insulating porous layer. The water-soluble polymer is further preferably cellulose ether or sodium alginate, particularly preferably cellulose ether.

Specific examples of the cellulose ether include carboxymethyl cellulose (CMC), hydroxyethyl cellulose (HEC), carboxy ethyl cellulose, methyl cellulose, ethyl cellulose, cyan ethyl cellulose, and oxyethyl cellulose. The cellulose ether is more preferably CMC or HEC, each of which does not significantly deteriorate even after an extended time period of use and is excellent in chemical stability. The cellulose ether is particularly preferably CMC.

The water-insoluble polymer in the form of particles dispersed in an aqueous solvent is preferably (i) a homopolymer of an acrylate monomer such as methyl methacrylate, ethyl methacrylate, glycidyl methacrylate, glycidyl acrylate, methyl acrylate, acrylic acid ethyl, or acrylic acid butyl or (ii) a copolymer of two or more kinds of monomers from the viewpoint of adhesiveness between inorganic filler particles.

In a case where the insulating porous layer contains a resin in addition to a filler made of a metal oxide, the filler and the resin are preferably in point contact with each other because in a case where the insulating porous layer is used as a member of a nonaqueous electrolyte secondary battery separator or a nonaqueous electrolyte secondary battery laminated separator, it is possible to further prevent an internal short circuit due to, for example, a breakage of the battery.

In the case where the insulating porous layer contains a resin in addition to a filler made of a metal oxide, the filler is contained in an amount preferably within a range of 1% by volume to 99% by volume, more preferably within a range of 5% by volume to 95% by volume, with respect to the entire insulating porous layer. The fine particles being contained in an amount within the above range can reduce the possibility that a void formed by contact between the fine particles is blocked by, for example, the resin, and thus allows the insulating porous layer to have a sufficient ion permeability. The above arrangement also allows the insulating porous layer to have an appropriate weight per unit area.

The insulating porous layer has a weight per unit area (for each surface) selected as appropriate in view of the strength, thickness, weight, and handleability of the insulating porous layer. The weight per unit area is, however, normally preferably within a range of 1 $g/m^2$ to 20 $g/m^2$, more preferably within a range of 4 $g/m^2$ to 10 $g/m^2$, in order to, in the case where the porous layer is used as a member of a nonaqueous electrolyte secondary battery or a nonaqueous electrolyte secondary battery laminated separator, increase the energy density per unit weight and energy density per unit volume of the battery. A weight per unit area of the insulating porous layer outside the above range will, in the case where the porous layer is used as a member of a nonaqueous electrolyte secondary battery or a nonaqueous electrolyte secondary battery laminated separator, result in a heavier nonaqueous electrolyte secondary battery.

The insulating porous layer contains, per square meter, an insulating porous layer constituent component in a volume (for each surface) preferably within a range of 0.5 $cm^3$ to 20 $cm^3$, more preferably within a range of 1 $cm^3$ to 10 $cm^3$, further preferably within a range of 2 $cm^3$ to 7 $cm^3$. In other words, the insulating porous layer has a component volume per unit area (for each surface) preferably within a range of 0.5 $cm^3/m^2$ to 20 $cm^3/m^2$, more preferably within a range of 1 $cm^3/m^2$ to 10 $cm^3/m^2$, further preferably within a range of 2 $cm^3/m^2$ to 7 $cm^3/m^2$. A component volume per unit area of the insulating porous layer of less than 0.5 $cm^3/m^2$ will, in the case where the porous layer is used as a member of a nonaqueous electrolyte secondary battery or a nonaqueous electrolyte secondary battery laminated separator, result in a failure to sufficiently prevent an internal short circuit due to, for example, a breakage of the battery.

The component volume per unit area is calculated by the following method:

(1) The weight per unit area of the insulating porous layer is multiplied by the weight concentration of each component of the insulating porous layer (that is, the weight concentration in the porous layer) to calculate the weight per unit area of each component.

(2) The weight per unit area of each component calculated in (1) is divided by the true specific gravity of that component. The sum of the resulting values is used as the component volume per unit area of the insulating porous layer.

A component volume per unit area of the insulating porous layer of more than 20 $cm^3/m^2$ will result in an increase in the resistance in transmissivity of lithium ions over the entire region of the insulating porous layer. Thus, in a case where a nonaqueous electrolyte secondary battery including the insulating porous layer repeats a cycle, the cathode will deteriorate, with the result of degradation in the rate characteristic and/or cycle characteristic.

The insulating porous layer has a porosity preferably within a range of 20% by volume to 90% by volume, more preferably within a range of 30% by volume to 70% by volume, for a sufficient ion permeability. Further, the insulating porous layer has pores each having a pore size of preferably not more than 3 μm, more preferably not more than 1 μm, in order for the insulating porous layer to have a sufficient ion permeability.

The insulating porous layer of an embodiment of the present invention may be produced by, for example, a method including (i) dissolving the resin in a solvent and dispersing the fine metal oxide particles in the solution to prepare a coating solution for forming an insulating porous layer, (ii) applying the coating solution to a surface of a base material, and then (iii) removing the solvent to allow an insulating porous layer to be deposited. The base material may be, for example, a porous film to be included in a nonaqueous electrolyte secondary battery laminated separator described later or an electrode to be included in a nonaqueous electrolyte secondary battery, particularly the cathode.

The solvent (disperse medium) may be any solvent that does not adversely influence the porous film, the electrode, or the like as a base material, that allows the resin to be dissolved therein uniformly and stably, and that allows the fine metal oxide particles to be dispersed therein uniformly and stably. Specific examples of the solvent (disperse medium) include water; lower alcohols such as methyl alcohol, ethyl alcohol, n-propyl alcohol, isopropyl alcohol, and t-butyl alcohol; acetone, toluene, xylene, hexane, N-methylpyrrolidone, N,N-dimethylacetamide, and N,N-dimethylformamide. The production method may use only one kind of solvent (disperse medium) or two or more kinds of solvents in combination.

The coating solution may be prepared by any method that allows the coating solution to satisfy conditions such as the resin solid content (resin concentration) necessary for a desired insulating porous layer and the amount of the fine metal oxide particles. Specific examples of the method for preparing the coating solution include mechanical stirring method, ultrasonic dispersion method, high-pressure dispersion method, and media dispersion method. Further, the filler may be dispersed in a solvent (disperse medium) with use of a conventionally publicly known disperser such as a three-one motor, a homogenizer, a media disperser, or a pressure disperser. Further, in a case where the fine metal oxide particles are prepared by wet grinding, a liquid containing a dissolved or swollen resin or an emulsified liquid containing a resin may be fed into a wet grinding device during wet grinding for preparation of fine metal oxide particles with a desired average particle diameter so that a coating solution is prepared simultaneously with the wet grinding for fine metal oxide particles. In other words, wet grinding for fine metal oxide particles and preparation of a coating solution may be carried out simultaneously in a single step. Further, the coating solution may contain, as a component(s) other than the resin or fine particles, an additive(s) such as a dispersing agent, a plasticizer, a surfactant, and a pH adjusting agent as long as an embodiment of the present invention can attain its objects. The coating solution may contain the additive(s) in any amount(s) as long as an embodiment of the present invention can attain its objects.

The coating solution may be applied to the base material by any method. For instance, in a case where an insulating porous layer is deposited on each of both surfaces of the base material, (i) a sequential deposition method may be used, which forms an insulating porous layer on one surface of the base material and then forms another insulating porous layer on the other surface, or (ii) a simultaneous deposition method may be used, which forms two insulating porous layers simultaneously on respective surfaces of the base material. The insulating porous layer may be formed by, for example, (i) a method of directly applying the coating solution to a surface of the base material and removing the solvent (disperse medium) from the coating solution, (ii) applying the coating solution to an appropriate support, removing the solvent (disperse medium) from the coating solution to form an insulating porous layer, pressure-bonding the insulating porous layer and the base material to each other, and peeling the support off, (iii) a method of applying the coating solution to a surface of an appropriate support, pressure-bonding the base material to the surface of the support, peeling the support off, and removing the solvent (disperse medium) from the coating solution, or (iv) a method of immersing the base material in the coating solution for dip coating and removing the solvent (disperse medium) from the coating solution. The thickness of the insulating porous layer may be controlled by adjusting, for example, (i) the thickness of a coating film in a wet state after the coating, (ii) the weight ratio of the resin and the fine particle, and/or (iii) the solid content concentration of the coating solution (that is, the sum of the resin concentration and the fine particle concentration). The support is, for example, a resin film, a metal belt, or a drum.

The coating solution may be applied to the base material or support by any method that allows for, for example, a necessary weight per unit area and a necessary coating area.

The coating solution may be applied by a conventionally publicly known method. Specific examples of the method include gravure coater method, small-diameter gravure coater method, reverse roll coater method, transfer roll coater method, kiss coater method, dip coater method, knife coater method, air doctor blade coater method, blade coater method, rod coater method, squeeze coater method, cast coater method, bar coater method, die coater method, screen printing method, and spray applying method.

The solvent (disperse medium) is removed typically by a drying method. Examples of the drying method include natural drying, air-blowing drying, heat drying, freeze-drying, and drying under reduced pressure. The solvent may, however, be removed by any method that allows the solvent (disperse medium) to be removed sufficiently. The method is preferably (i) a drying method that involves blowing air in a direction opposite to the direction in which a wet coating layer is transferred, (ii) heat drying that uses far infrared heating, or (iii) freeze-drying from the viewpoint of a homogenized internal structure for an insulating porous layer to be produced. The coating solution may be dried after replacing the solvent (disperse medium) contained in the coating solution with another solvent. The solvent (disperse medium) may be replaced with another solvent for removal by, for example, a method of (i) preparing another solvent (hereinafter referred to as "solvent X") that dissolves the solvent (disperse medium) contained in the coating solution and that does not dissolve the resin contained in the coating solution, (ii) immersing the base material or support, to which the coating solution has been applied and on which a coating film has been formed, into the solvent X to replace the solvent (disperse medium) in the coating film on the base material or support with the solvent X, and (iii) evaporating the solvent X. This method is preferable as it allows the solvent (disperse medium) to be removed efficiently from the coating solution. In a case where (i) the base material is a porous film containing a polyolefin as a main component and (ii) the coating film, formed on the base material (porous film) or support by applying the coating solution thereto, is heated to remove the solvent (disperse medium) or solvent X from the coating film, the coating film is desirably heated at a temperature that does not decrease the air permeability of the porous film, specifically within a range of 10° C. to 120° C., preferably within a range of 20° C. to 85° C., to prevent pores in the porous film from contracting to decrease the air permeability of the porous film. The drying method may involve use of a normal drying device.

[Porous Film]

The nonaqueous electrolyte secondary battery laminated separator of an embodiment of the present invention includes a porous film to serve as a base material of the nonaqueous electrolyte secondary battery laminated separator. The porous film contains a polyolefin as a main component and has inside itself a large number of pores connected to one another. The porous film allows a gas, a liquid, or the like to pass therethrough from one surface to the other.

A porous film containing a polyolefin as a main component means a porous film containing a polyolefin at a proportion of not less than 50% by volume, more preferably not less than 90% by volume, further preferably not less than 95% by volume, of the entire porous film. The polyolefin preferably contains a high molecular weight component having a weight-average molecular weight of $5 \times 10^5$ to $15 \times 10^6$. The polyolefin particularly preferably contains a high molecular weight component having a weight-average molecular weight of not less than 1,000,000 because such a high molecular weight component increases (i) the strength of the porous film and (ii) that of the laminated body including the porous film, that is, the nonaqueous electrolyte secondary battery laminated separator.

Specific examples of a thermoplastic resin as the polyolefin include homopolymers (for example, polyethylene, polypropylene, and polybutene) and copolymers (for example, ethylene-propylene copolymer) produced through (co)polymerization of a monomer such as ethylene, propylene, 1-butene, 4-methyl-1-pentene, or 1-hexene. Among the above examples, polyethylene is preferable because it is able to prevent (shutdown) the flow of an excessively large current at a lower temperature. Examples of the polyethylene include a low-density polyethylene, a high-density polyethylene, a linear polyethylene (ethylene-α-olefin copolymer), and an ultra high molecular weight polyethylene having a weight-average molecular weight of not less than 1,000,000. Among these examples, an ultra high molecular weight polyethylene having a weight-average molecular weight of not less than 1,000,000 is preferable.

The porous film has a thickness selected as appropriate in view of the thickness of the nonaqueous electrolyte secondary battery laminated separator. The thickness is, however, within a range of 4 μm to 50 μm, preferably within a range of 5 μm to 30 μm, in a case where (i) the porous film is used as a base material and (ii) the insulating porous layer is disposed on one or both surfaces of the porous film to produce a nonaqueous electrolyte secondary battery laminated separator. A thickness of the porous film of less than 4 μm will lead to an insufficient mechanical strength for the porous film, with the possible result of a breakage of the porous film or a nonaqueous electrolyte secondary battery laminated separator including the porous film during the battery assembly. Further, such a small thickness will also lead to a decrease in the amount of electrolyte solution retained by the porous film, with the result of degradation in long-term characteristics of a nonaqueous electrolyte secondary battery including the porous film. On the other hand, a thickness of the porous film of more than 50 μm will result in an increase in the resistance in transmissivity of lithium ions over the entire region of a nonaqueous electrolyte secondary battery laminated separator including the porous film. Thus, as a nonaqueous electrolyte secondary battery including the nonaqueous electrolyte secondary battery laminated separator repeats a cycle, the cathode will deteriorate, with the result of degradation in the rate characteristic and/or cycle characteristic. Further, such a large thickness will lead to an increase in the distance between the anode and the cathode, with the result of a larger nonaqueous electrolyte secondary battery.

The porous film has pores each having a pore size of preferably not more than 3 μm, further preferably not more than 1 μm.

The porous film for use in the nonaqueous electrolyte secondary battery laminated separator of an embodiment of the present invention has a capacitance per 19.6 $mm^2$ of preferably not less than 0.0230 nF and not more than 0.0270 nF, more preferably not less than 0.0235 nF and not more than 0.0270 nF.

The porous film for use in the nonaqueous electrolyte secondary battery laminated separator of an embodiment of the present invention has a relative dielectric constant preferably within a range of 1.45 to 1.85, more preferably within a range of 1.50 to 1.80.

The capacitance and relative dielectric constant of the porous film of the nonaqueous electrolyte secondary battery laminated separator are those of a porous film remaining after peeling an insulating porous layer from a nonaqueous electrolyte secondary battery laminated separator, which originally includes the porous film and the insulating porous layer.

The above respective ranges of the capacitance and relative dielectric constant of the porous film for use in the nonaqueous electrolyte secondary battery laminated separator are higher than the respective ranges of the capacitance and relative dielectric constant of any typical porous film as a separate member which porous film contains a polyolefin as a main component. A porous film for a nonaqueous electrolyte secondary battery laminated separator may be produced to have a capacitance (relative dielectric constant) within the above range by, for example, a method of, when an insulating porous layer is disposed on a porous film in a method described later for producing a nonaqueous electrolyte secondary battery laminated separator, impregnating the porous film with a portion of the binder resin contained in the insulating porous layer. This method may be performed as the binder resin has a relative dielectric constant higher than that of the polyolefin.

The nonaqueous electrolyte secondary battery laminated separator of an embodiment of the present invention, which includes the above insulating porous layer and the above porous film having a capacitance higher than normal, allows a nonaqueous electrolyte secondary battery including the nonaqueous electrolyte secondary battery laminated separator integrated therein to have a further improved output characteristic.

The porous film has a weight per unit area selected as appropriate in view of the strength, thickness, weight, and handling easiness of the nonaqueous electrolyte secondary battery laminated separator. The weight per unit area is, however, normally preferably within a range of 4 $g/m^2$ to 20 $g/m^2$, more preferably within a range of 5 $g/m^2$ to 12 $g/m^2$, in order to increase the energy density per unit weight and energy density per unit volume of a nonaqueous electrolyte secondary battery including the nonaqueous electrolyte secondary battery laminated separator integrated therein.

The porous film has an air permeability preferably within a range of 30 sec/100 mL to 500 sec/100 mL, more preferably within a range of 50 sec/100 mL to 300 sec/100 mL, in terms of Gurley values. The porous film having such an air permeability allows the nonaqueous electrolyte secondary battery laminated separator to have a sufficient ion permeability.

The porous film has a porosity preferably within a range of 30% by volume to 60% by volume, more preferably within a range of 35% by volume to 55% by volume, in order to allow the nonaqueous electrolyte secondary battery laminated separator to (i) retain a larger amount of electrolyte solution and (ii) achieve a function of reliably preventing (shutdown) the flow of an excessively large current at a lower temperature.

The porous film will, if it has a porosity of less than 30% by volume, have an increased resistance. The porous film will, if it has a porosity of more than 60% by volume, have a decreased mechanical strength.

The porous film has pores each having a pore size of preferably not more than 3 μm, more preferably not more than 1 μm, in order to (i) allow the nonaqucous electrolyte secondary battery laminated separator to have a sufficient ion permeability and (ii) prevent particles from entering the cathode, the anode, or the like.

The porous film may be produced through any method, and may be produced through, for example, a method of (i) adding a plasticizing agent to a resin such as a polyolefin to shape the polyolefin into a film and then removing the plasticizing agent with use of an appropriate solvent.

Specifically, in a case of, for example, producing a porous film with use of (i) a polyolefin resin containing an ultra high molecular weight polyethylene and (ii) a low molecular weight polyolefin having a weight-average molecular weight of not more than 10,000, such a porous film is, in terms of production cost, preferably produced through the method including steps of:

(1) kneading (i) 100 parts by weight of the ultra high molecular weight polyethylene, (ii) 5 parts by weight to 200 parts by weight of the low molecular weight polyolefin having a weight-average molecular weight of not more than 10,000, and (iii) 100 parts by weight to 400 parts by weight of an inorganic filler made of calcium carbonate and the like to produce a polyolefin resin composition, (2) shaping the polyolefin resin composition into a sheet, then either (3) removing the inorganic filler from the sheet produced in the step (2), and (4) stretching the sheet, from which the inorganic filler has been removed in the step (3), to produce a porous film, or (3') stretching the sheet produced in the step (2), and (4') removing the inorganic filler from the sheet stretched in the step (3') to produce a porous film.

The porous film may alternatively be a commercially available product having the above physical properties.

The porous film is preferably subjected to a hydrophilization treatment before the formation of an insulating porous layer, that is, before the application of a coating solution described later. Performing a hydrophilization treatment on the porous film further improves the coating easiness of the coating solution and thus allows a more uniform insulating porous layer to be formed. This hydrophilization treatment is effective in a case where the solvent (disperse medium) contained in the coating solution has a high proportion of water. Specific examples of the hydrophilization treatment include publicly known treatments such as (i) a chemical treatment involving an acid, an alkali, or the like, (ii) a corona treatment, and (iii) a plasma treatment. Among these hydrophilization treatments, a corona treatment is preferable because it can not only hydrophilize the porous film within a relatively short time period, but also hydrophilize only a surface and its vicinity of the porous film to leave the inside of the porous film unchanged in quality.

[Method for Producing Nonaqueous Electrolyte Secondary Battery Laminated Separator]

A method of an embodiment of the present invention for producing a nonaqueous electrolyte secondary battery laminated separator may be, for example, a method that corresponds to the above-described method for producing an insulating porous layer and that uses the above porous film as a base material.

During the production, the capacitance and relative dielectric constant of the porous film may each be controlled within the above range, that is, the impregnation of the porous film with a portion of the binder resin of the insulating porous layer may be controlled, by a method of controlling the impregnation while the coating film is dried or a method of controlling the impregnation after the coating film is dried. Examples of the former method include (i) allowing for a pressure difference between the upper and lower coating surfaces and (ii) raising the temperature stepwise. Examples of the latter method include pressing the insulating porous layer.

Appropriately controlling the filler distribution and porosity distribution by the above method can improve the capacitance (relative dielectric constant) of the porous film as appropriate. This allows the porous film to have a capacitance (relative dielectric constant) controlled to be within a preferable range, and consequently allows the nonaqueous electrolyte secondary battery laminated separator as a whole to have a capacitance (relative dielectric constant) controlled to be within a preferable range.

[Embodiment 3: Nonaqueous Electrolyte Secondary Battery Member and Embodiment 4: Nonaqueous Electrolyte Secondary Battery]

Embodiment 3 of the present invention may be a nonaqueous electrolyte secondary battery member including a cathode, the insulating porous layer as Embodiment 1 of the present invention, and an anode, the cathode, the porous layer, and the anode being arranged in that order. Embodiment 3 of the present invention may alternatively be a nonaqueous electrolyte secondary battery member including a cathode, the nonaqueous electrolyte secondary battery laminated separator as Embodiment 2 of the present invention, and an anode, the cathode, the nonaqueous electrolyte secondary battery laminated separator, and the anode being arranged in that order.

The nonaqueous electrolyte secondary battery member of an embodiment of the present invention includes, as a separator, an insulating porous layer or nonaqueous electrolyte secondary battery laminated separator each having a capacitance controlled within a particular range. This allows a nonaqueous electrolyte secondary battery including the nonaqueous electrolyte secondary battery member integrated therein to have an improved output characteristic.

Embodiment 4 of the present invention is a nonaqueous electrolyte secondary battery including (i) the insulating porous layer as Embodiment 1 of the present invention or (ii) the nonaqueous electrolyte secondary battery laminated separator as Embodiment 2 of the present invention. The nonaqueous electrolyte secondary battery includes a cathode, an anode, and an electrolyte solution in addition to the insulating porous layer or the nonaqueous electrolyte secondary battery laminated separator.

The nonaqueous electrolyte secondary battery of an embodiment of the present invention includes, as a separator, an insulating porous layer or nonaqueous electrolyte secondary battery laminated separator each having a capacitance controlled within a particular range. This allows the nonaqueous electrolyte secondary battery to have an excellent output characteristic.

The following description will discuss the individual members by taking a lithium ion secondary battery as an example nonaqueous electrolyte secondary battery. The nonaqueous electrolyte secondary battery member and nonaqueous electrolyte secondary battery of an embodiment of the present invention each include the above-described insulating porous layer or nonaqueous electrolyte secondary battery laminated separator of an embodiment of the present invention. Constituent elements of the nonaqueous electrolyte secondary battery other than the insulating porous layer or nonaqueous electrolyte secondary battery laminated separator are not limited to those described below.

[Electrolyte Solution]

The nonaqueous electrolyte secondary battery of an embodiment of the present invention includes, for example, a nonaqueous electrolyte solution prepared by dissolving a lithium salt in an organic solvent as an electrolyte solution solvent. Examples of the lithium salt include $LiClO_4$, $LiPF_6$, $LiAsF_6$, $LiSbF_6$, $LiBF_4$, $LiCF_3SOd3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. The present embodiment may use (i) only one kind of the above lithium salts or (ii) two or more kinds of the above lithium salts in combination. The present embodiment preferably uses, among the above lithium salts, at least one fluorine-containing lithium salt selected from the group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$.

The electrolyte solution solvent is not limited to any particular one. Specific examples of the electrolyte solution solvent include carbonates such as ethylene carbonate (EC), propylene carbonate (PMC), dimethyl carbonate (DMC), diethyl carbonate (DEC), ethyl methyl carbonate (EMC), 4-trifluoromethyl-1,3-dioxolane-2-on, and 1,2-di(methoxy carbonyloxy)ethane; ethers such as 1,2-dimethoxyethane, 1,3-dimethoxypropane, pentafluoropropyl methylether, 2,2,3,3-tetrafluoropropyl difluoro methylether, tetrahydrofuran, and 2-methyl tetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidonc; sulfur-containing compounds such as sulfolane, dimethyl sulfoxide, and 1,3-propane sultone; and fluorine-containing organic solvents each prepared by introducing a fluorine group into the organic solvent. The present embodiment may use (i) only one kind of the above electrolyte solution solvents or (ii) two or more kinds of the above electrolyte solution solvents in combination. Among the above electrolyte solution solvents, carbonates are preferable. A mixed solvent of a cyclic carbonate and an acyclic carbonate or a mixed solvent of a cyclic carbonate and an ether is more preferable. The mixed solvent of a cyclic carbonate and an acyclic carbonate is preferably a mixed solvent of ethylene carbonate, dimethyl carbonate, and ethyl methyl carbonate because such a mixed solvent allows a wider operating temperature range, and is not easily decomposed even in a case where the present embodiment uses, as an anode active material, a graphite material such as natural graphite or artificial graphite.

The nonaqueous electrolyte secondary battery laminated separator has a relative dielectric constant having a proportion of preferably not less than 0.0190 and not more than 0.930, more preferably not less than 0.0190 and not more than 0.910, with respect to the relative dielectric constant of the electrolyte solution solvent contained in the nonaqueous electrolyte secondary battery of an embodiment of the present invention. The proportion of the relative dielectric constant being within the above range is preferable for an improved rate characteristic.

The relative dielectric constant of the electrolyte solution solvent in the present specification is as defined in "Denki-kagaku Binran [Electrochemistry Handbook]", 5th edition, 2000, edited by The Electrochemical Society of Japan). Table 2 below shows the respective relative dielectric constants of major solvents.

TABLE 2

Relative dielectric constants of electrolyte solutions

| Typical electrolyte solution | Relative dielectric constant [*] |
| --- | --- |
| Ethylene carbonate (EC) | 89.78 (40) |
| Propylene carbonate (PC) | 64.92 |
| Dimethyl carbonate (DMC) | 3.1 |
| Diethyl carbonate (DEC) | 2.8 |
| Ethyl methyl carbonate (EMC) | 2.9 |
| EC:EMC:DEC = 30:50:20 (volume ratio) | 18.8 |

[*] Measurements at a temperature of 25° C., except that "(40)" indicates a measurement at a temperature of 40° C. (EC is solid at 25° C.).

[Cathode]

The cathode may normally be a cathode typically used in a nonaqueous electrolyte secondary battery. The cathode is, for example, a sheet-shaped cathode including (i) a cathode mix containing a cathode active material, an electrically conductive material, and a binding agent and (ii) a cathode current collector supporting the cathode mix thereon.

The cathode active material is, for example, a material capable of being doped and dedoped with lithium ions. Specific examples of such a material include a lithium complex oxide containing at least one transition metal such as V, Mn, Fe, Co, or Ni. Among such lithium complex oxides, (i) a lithium complex oxide having an α-$NaFeO_2$ structure such as lithium nickelate and lithium cobaltate and (ii) a lithium complex oxide having a spinel structure such as lithium manganese spinel are preferable because such lithium complex oxides have a high average discharge potential. The lithium complex oxide containing the at least one transition metal may further contain any of various metallic elements, and is more preferably complex lithium nickelate.

Further, the complex lithium nickelate particularly preferably contains at least one metallic element selected from the group consisting of Ti, Zr, Ce, Y, V, Cr, Mn, Fe, Co, Cu, Ag, Mg, Al, Ga, In, and Sn at a proportion of 0.1 mol % to 20 mol % with respect to the sum of the number of moles of the at least one metallic element and the number of moles of Ni in the lithium nickelate. This is because such a complex lithium nickelate allows an excellent cycle characteristic in a case where it is used in a high-capacity battery.

Examples of the electrically conductive material include carbonaceous materials such as natural graphite, artificial graphite, cokes, carbon black, pyrolytic carbons, carbon fiber, and a fired product of an organic polymer compound. The present embodiment may use (i) only one kind of the above electrically conductive materials or (ii) two or more kinds of the above electrically conductive materials in combination, for example, a mixture of artificial graphite and carbon black.

Examples of the binding agent include thermoplastic resins such as polyvinylidene fluoride, a copolymer of vinylidene fluoride, polytetrafluoroethylene, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-hexafluoro propylene copolymer, a vinylidene fluoride-hexafluoropropylene-tetrafluoroethylene copolymer, and a thermoplastic polyimide, polyethylene, and polypropylene, as well as acrylic resin and styrene-butadiene-rubber. The binding agent functions also as a thickening agent.

The cathode mix may be prepared by, for example, a method of applying pressure to the cathode active material, the electrically conductive material, and the binding agent on the cathode current collector or a method of using an appropriate organic solvent so that the cathode active material, the electrically conductive material, and the binding agent are in a paste form.

The cathode current collector is, for example, an electric conductor such as Al, Ni, and stainless steel, among which Al is preferable because Al is easily processed into a thin film and is inexpensive.

The sheet-shaped cathode may be produced, that is, the cathode mix may be supported by the cathode current collector, by, for example, a method of applying pressure to the cathode active material, the electrically conductive material, and the binding agent on the cathode current collector to form a cathode mix thereon or a method of (i) using an appropriate organic solvent so that the cathode active material, the electrically conductive material, and the binding agent are in a paste form to provide a cathode mix, (ii)

applying the cathode mix to the cathode current collector, (iii) drying the applied cathode mix to prepare a sheet-shaped cathode mix, and (iv) applying pressure to the sheet-shaped cathode mix so that the sheet-shaped cathode mix is firmly fixed to the cathode current collector.

[Anode]

The anode may normally be an anode typically used in a nonaqueous electrolyte secondary battery. The anode is, for example, a sheet-shaped anode including (i) an anode mix containing an anode active material and (ii) an anode current collector supporting the anode mix thereon. The sheet-shaped anode preferably contains the above-described electrically conductive material and binding agent.

The anode active material is, for example, (i) a material capable of being doped and dedoped with lithium ions, (ii) a lithium metal, or (iii) a lithium alloy. Specific examples of the material include carbonaceous materials such as natural graphite, artificial graphite, cokes, carbon black, pyrolytic carbons, carbon fiber, and a fired product of an organic polymer compound; and chalcogen compounds such as an oxide and a sulfide that are doped and dedoped with lithium ions at an electric potential lower than that for the cathode. Among the above anode active materials, a carbonaceous material containing a graphite material such as natural graphite or artificial graphite as a main component is preferable because such a carbonaceous material has high electric potential flatness and low average discharge potential, and can thus be combined with a cathode to achieve high energy density.

The anode mix may be prepared by, for example, a method of applying pressure to the anode active material on the anode current collector or a method of using an appropriate organic solvent so that the anode active material is in a paste form.

The anode current collector is, for example, Cu, Ni, or stainless steel, among which Cu is preferable because Cu is not easily alloyed with lithium in the case of a lithium ion secondary battery and is easily processed into a thin film.

The sheet-shaped anode may be produced, that is, the anode mix may be supported by the anode current collector, by, for example, a method of applying pressure to the anode active material on the anode current collector to form an anode mix thereon or a method of (i) using an appropriate organic solvent so that the anode active material is in a paste form to provide an anode mix, (ii) applying the anode mix to the anode current collector, (iii) drying the applied anode mix to prepare a sheet-shaped anode mix, and (iv) applying pressure to the sheet-shaped anode mix so that the sheet-shaped anode mix is firmly fixed to the anode current collector. The paste preferably contains the above-described conductive auxiliary agent and binding agent.

[Methods for Producing Nonaqueous Electrolyte Secondary Battery Member and Nonaqueous Electrolyte Secondary Battery]

A method for producing the nonaqueous electrolyte secondary battery member of an embodiment of the present invention is, for example, a method of arranging (i) the cathode, (ii) the nonaqueous electrolyte secondary battery insulating porous layer or nonaqueous electrolyte secondary battery laminated separator of an embodiment of the present invention, and (iii) an anode in that order to produce a nonaqueous electrolyte secondary battery member.

The nonaqueous electrolyte secondary battery of an embodiment of the present invention may be produced by, for example, the following method: The nonaqueous electrolyte secondary battery in accordance with an embodiment of the present invention may be produced by (i) arranging the cathode, the nonaqueous electrolyte secondary battery insulating porous layer or nonaqueous electrolyte secondary battery laminated separator, and the anode in that order to form a nonaqueous electrolyte secondary battery member, (ii) inserting the nonaqueous electrolyte secondary battery member into a container for use as a housing of the nonaqueous electrolyte secondary battery, (iii) filling the container with a nonaqueous electrolyte solution, and (iv) hermetically sealing the container under reduced pressure. The nonaqueous electrolyte secondary battery may have any shape such as the shape of a thin plate (sheet), a disk, a cylinder, or a prism such as a cuboid. The nonaqueous electrolyte secondary battery member and nonaqueous electrolyte secondary battery of an embodiment of the present invention may each be produced by any method, and may be produced by a conventionally publicly known method.

The present invention is not limited to the description of the embodiments above, but may be altered in various ways by a skilled person within the scope of the claims. Any embodiment based on a proper combination of technical means disclosed in different embodiments is also encompassed in the technical scope of the present invention. Further, combining different technical means disclosed in different embodiments can provide a new technical feature.

EXAMPLES

The following description will discuss an embodiment of the present invention in greater detail on the basis of Examples and Comparative Examples. The present invention is, however, not limited by these Examples.

[Measurement Methods]

The methods below were used for Examples and Comparative Examples to measure, for example, physical properties of (i) a nonaqueous electrolyte secondary battery laminated separator (laminated porous film), (ii) an A layer (porous film), and (iii) a B layer (insulating porous layer) and to also measure the discharge output characteristic (rate characteristic) of a nonaqueous electrolyte secondary battery.

(1) Film Thickness (Unit: μm):

The thickness of the nonaqueous electrolyte secondary battery laminated separator (that is, the total film thickness), the thickness of the A layer, and the thickness of the B layer were measured with use of VL-50, a high-precision digital measuring machine produced by Mitutoyo Corporation.

(2) Weight Per Unit Area (Unit: $g/m^2$):

A square having each side with a length of 8 cm was cut out from the laminated porous film as a sample, and the weight W (g) of the sample was measured. Then, the weight per unit area of the laminated porous film (that is, the total weight per unit area) was calculated on the basis of the following formula:

$$\text{Weight per unit area}(g/m^2) = W/(0.08 \times 0.08)$$

The weight per unit area of the A layer was calculated similarly. The weight per unit area of the B layer was calculated by subtracting the weight per unit area of the A layer from the total weight per unit area.

(3) Average Particle Diameter and Particle Size Distributions (D10, D50, and D90 [Volume-Based]) (Unit: μm):

The particle diameter and particle size distributions of the filler were measured with use of MICROTRAC (MODEL: MT-3300EXII), produced by Nikkiso Co., Ltd.

(4) Measurement of Relative Dielectric Constant

The relative dielectric constant of the nonaqueous electrolyte secondary battery laminated separator produced in each of the Examples and Comparative Examples was measured by a method in conformity to JIS C 2138 with use of a precision LCR meter produced by Agilent Technologies (model number: E4980A) under the conditions of an electrode diameter φ5 mm and a frequency of 1 kHz in an environment having a temperature of 23° C.±1° C. and a humidity of 50% RH±5% RH. A similar method was used to measure the relative dielectric constant of the A layer (porous film) remaining after peeling the B layer (insulating porous layer) from the nonaqueous electrolyte secondary battery laminated separator.

(5) Calculation of Capacitance (Unit: nF)

The capacitance C of a solid insulating material having a relative dielectric constant ∈r, a thickness d, and an area S is represented by the following Formula (0):

$$C = \in \times \in r \times S/d \quad (0)$$

The respective capacitances of the nonaqueous electrolyte secondary battery laminated separator, the A layer, and the B layer are thus represented by the following Formulae (1) through (3):

$$C_0 = \in \times \in r_0 \times S/d_0 \quad (1)$$

$$C_1 = \in \times \in r_1 \times S/d_1 \quad (2)$$

$$C_2 = \in \times \in r_2 \times S/d_2 \quad (3),$$

where $C_0$ is the capacitance of the laminated porous film, $\in (=8.854 \times 10^{-12}$ (F/m)) is the dielectric constant of a vacuum, $\in r_0$ is the relative dielectric constant thereof, $C_1$ is the capacitance of the B layer, $\in r_1$ is the relative dielectric constant thereof, $C_2$ is the capacitance of the A layer, and $\in r_2$ is the relative dielectric constant thereof.

According to a formula representative of a combined capacitance of a circuit including capacitors connected in series, the respective capacitances of the capacitors have a relation represented by the following Formula (4):

$$1/C_0 = (1/C_1) + (1/C_2) \quad (4)$$

The capacitance $C_1$ of the B layer is thus represented by the following Formula (5):

$$C_1 = C_0 \times C_2/(C_2 - C_0) \quad (5)$$

The capacitance of the B layer was calculated from Formula (5) above.

The above Formulae (1) to (3) can be substituted into Formula (5) for a deformation. The relative dielectric constant $\in r_1$ of the B layer is, as a result, represented by the following Formula (6):

$$\in r_1 = C_0 \times \in r_2 \times d_1/(\in \times \in r_2 \times S - C_0 \times d_2) \quad (6)$$

The relative dielectric constant of the B layer was calculated from Formula (6).

In each of the Examples and Comparative Examples, the relative dielectric constant was measured with use of an electrode with a φ5 mm. The area S was thus the same (S=19.6 mm²) for all the Examples and Comparative Examples.

(6) Rate Characteristic (%):

A nonaqueous electrolyte secondary battery prepared in each of the Examples and Comparative Examples was subjected to four cycles of initial charge/discharge. Each cycle of the initial charge/discharge was performed under conditions that the temperature was 25° C., the voltage range was 4.1 V to 2.7 V, and the current value was 0.2 C (where 1 C is defined as the value of a current at which a rated capacity based on a discharge capacity at 1 hour rate is discharged for 1 hour. The same applies hereinafter).

After the initial charge/discharge, the nonaqueous electrolyte secondary battery was subjected to (i) three cycles of charging/discharging at 55° C. with use of a constant current having a charge current value of 1 C and a discharge current value of 0.2 C and to (ii) three more cycles of charging/discharging at 55° C. with use of a constant current having a charge current value of 1 C and a discharge current value of 20 C. The discharge capacity was measured for each of the two cases.

The measurement value of the discharge capacity was of the last one of the three cycles for each of the discharge current values of 0.2 C and 20 C. The ratio of the measurement values (discharge capacity for 20 C/discharge capacity for 0.2 C) was used as a rate characteristic (%).

Example 1

<Preparation of a Layer>

A porous film as a base material was prepared from polyethylene (polyolefin). Specifically, 70 parts by weight of an ultra-high-molecular-weight polyethylene powder (340M [produced by Mitsui Chemicals, Inc.]) and 30 parts by weight of a polyethylene wax having a weight-average molecular weight of 1000 (FNP-0115 [produced by Nippon Seiro Co., Ltd.]) were mixed with each other to prepare mixed polyethylene. To 100 parts by weight of the mixed polyethylene prepared, 0.4 parts by weight of an antioxidant (Irg1010 [produced by CIBA Specialty Chemicals Inc.]), 0.1 parts by weight of another antioxidant (P168 [produced by CIBA Specialty Chemicals Inc.]), and 1.3 parts by weight of sodium stearate were added, and calcium carbonate having an average particle diameter of 0.1 μm (produced by Maruo Calcium Co., Ltd.) was further added to have a proportion of 38% by volume with respect to the total volume. This composition was mixed in a Henschel mixer in the form of powder, and was then melted and kneaded in a twin screw kneading extruder to provide a polyethylene resin composition. Next, this polyethylene resin composition was rolled with use of a pair of rolls each having a surface temperature set at 150° C. This prepared a sheet. This sheet was immersed in an aqueous hydrochloric acid solution (which contained 4 mol/L of hydrochloric acid and 0.5 weight % of a nonionic surfactant) so that the calcium carbonate was dissolved for removal. Subsequently, the sheet was drawn at 105° C. to have an area 6 times the original area. This prepared a porous film made of polyethylene (A layer).

<Preparation of B Layer>

(Production of Fine Metal Oxide Particles)

Aluminiumoxid/Titandioxid ($Al_2O_3$:$TiO_2$=99:1, solid solution), produced by ceram GmbH, was used as a metal oxide.

This metal oxide was ground for 4 hours in a vibrating mill provided with an alumina pot having a capacity of 3.3 L and an alumina ball having φ of 15 mm. This produced fine metal oxide particles.

(Production of Coating Solution)

The fine metal oxide particles, a vinylidene fluoride-hexafluoro propylene copolymer (KYNAR2801 [product name, produced by Arkema Inc.) as a binder resin, and N-methyl-2-pyrrolidinone (produced by Kanto Chemical Co., Inc.) as a solvent were mixed with one another as follows:

First, 10 parts by weight of the vinylidene fluoride-hexafluoro propylene copolymer was added to 90 parts by weight of the fine metal oxide particles to prepare a mixture. The solvent was added to this mixture so that the solid content (that is, the fine metal oxide particles and the vinylidene fluoride-hexafluoro propylene copolymer) had a concentration of 40 weight %. This produced a mixed solution. This mixed solution was stirred and mixed in a FILMIX (registered trademark), a thin-film rotary high-speed mixer produced by PRIMIX Corporation. This produced a uniform coating solution 1.

<Preparation of Nonaqueous Electrolyte Secondary Battery Laminated Separator (Laminated Porous Film)>

The coating solution 1 produced as above was applied to a surface of the A layer by doctor blade method. The resulting coating film was dried at 85° C. with use of an air blowing dryer (model: WFO-601SD, produced by Tokyo Rikakikai Co., Ltd.). This formed a B layer. After the drying, the B layer was pressed. These operations produced a laminated porous film 1 including (i) an A layer and (ii) a B layer disposed on a surface of the A layer.

<Measurement of Physical Properties of Nonaqueous Electrolyte Secondary Battery Laminated Separator, Porous Film, and Insulating Porous Layer>

The above measurement methods were used to measure, for example, physical properties of (i) the laminated porous film 1 produced as above, (ii) the porous film (A layer), included in the laminated porous film 1, and (iii) the insulating porous layer (B layer), included in the laminated porous film 1. Table 3 shows the results.

Each capacitance was calculated as below. The laminated porous film measured had a relative dielectric constant $\in_{r0}$=1.73. The porous film had a relative dielectric constant $\in_{r2}$=1.71. The laminated separator measured had a thickness $d_0$=0.0185×10$^{-3}$ (m). The insulating porous layer had a thickness $d_1$=0.0075×10$^{-3}$ (m). The porous film had a thickness $d_2$=0.011×10$^{-3}$ (m).

With reference to Formula (1), the laminated porous film of Example 1 had the following capacitance $C_0$, assuming that the dielectric constant of a vacuum is $\in$(=8.854×10$^{-12}$ (F/m)):

$$C_0=\in\times\in_{r0}\times S/d_0=8.854\times10^{-12} (F/m)\times1.73\times19.6\times10^{-6} (m^2)/(0.0185\times10-3 (m))=0.0162\times10^{-9} (F)=0.01623 (nF)$$

The insulating porous layer of Example 1 had a relative dielectric constant $\in_{r1}$ measured as below with reference to Formula (6), in view of the insulating porous layer having a thickness $d_1$=0.0075×10$^{-3}$ (m) and the porous film having a thickness $d_2$=0.011×10$^{-3}$ (m):

$$\in_{r1}=C_0\times\in_{r2}\times d_1/(\in\times\in_{r2}\times S-C_0\times d_2)=0.01623\times10^{-9} (F)\times1.71\times0.0075\times10^{-3} (m)/((8.854\times10^{-12} (F/m)\times1.71\times19.6\times10^{-6} (m^2)-0.01623\times10^{-9} (F)\times0.011\times10^{-3} (m)=1.76$$

With reference to Formula (2), the relative dielectric constant $\in_{r1}$ calculated with reference to Formula (6) above and the capacitance $C_1$ of the insulating porous layer are:

$$C_1=\in\times\in_{r1}\times S/d_1=8.854\times10^{-12} (F/m)\times1.76\times19.6\times10^{-6} (m^2)/(0.0075\times10^{-3} (m))=0.04072\times10^{-9} (F)=0.04072 (nF)$$

With reference to Formula (3), the porous film had the following capacitance $C_2$:

$$C_2=\in\times\in_{r2}\times S/d_2=8.854\times10^{-12} (F/m)\times1.71\times19.6\times10^{-6} (m^2)/(0.011\times10^{-3} (m))=0.0270\times10^{-9} (F)=0.0270 (nF)$$

<Preparation of Nonaqueous Electrolyte Secondary Battery>

A nonaqueous electrolyte secondary battery was prepared from a cathode below, an anode below, and the laminated porous film 1 by an assembly method below.

(Cathode)

A commercially available cathode was used that was produced by applying, to an aluminum foil, a mixture of $LiNi_{0.5}Mn_{0.3}Co0.2O_2$, an electrically conductive material, and PVDF (with a weight ratio of 92:5:3). The aluminum foil for the cathode was cut so that (i) a portion of the cathode in which portion a cathode active material layer was present had a size of 45 mm×30 mm and (ii) a portion of the cathode in which portion a cathode active material layer was absent and which had a width of 13 mm remained around the above portion. The cathode active material layer had a thickness of 58 μm, a density of 2.50 g/cm$^3$, and a cathode capacity of 174 mAh/g.

(Anode)

A commercially available anode was used that was produced by applying, to a copper foil, a mixture of graphite, a styrene-1,3-butadiene copolymer, and carboxymethyl cellulose sodium (with a weight ratio of 98:1:1). The copper foil for the anode was cut so that (i) a portion of the anode in which portion an anode active material layer was present had a size of 50 mm×35 mm and (ii) a portion of the anode in which portion an anode active material layer was absent and which had a width of 13 mm remained around the above portion. The anode active material layer had a thickness of 49 μm, a density of 1.40 g/cm$^3$, and an anode capacity of 372 mAh/g.

(Assembly Method)

In a laminate pouch, the cathode, the nonaqueous secondary battery separator, and the anode were laminated (disposed) in this order to produce a nonaqueous electrolyte secondary battery member 1. In this case, the cathode and the anode were positioned so that the whole of a main surface of the cathode active material layer of the cathode was included in a range of a main surface (that is, overlapped the main surface) of the anode active material layer of the anode.

Subsequently, the nonaqueous electrolyte secondary battery member 1 was put in a bag made by laminating an aluminum layer and a heat seal layer, and 0.25 mL of a nonaqueous electrolyte solution was poured into the bag. The nonaqueous electrolyte solution was an electrolyte solution having a temperature of 25° C. which electrolyte solution was prepared by dissolving $LiPF_6$ having a concentration of 1.0 mol/liter in a mixed solvent containing (i) ethyl methyl carbonate (having a relative dielectric constant of 2.9 at a temperature of 25° C.), (ii) diethyl carbonate (having a relative dielectric constant of 2.8 at a temperature of 25° C.), and (iii) ethylene carbonate (having a relative dielectric constant of 89.78 at a temperature of 40° C.) at a volume ratio of 50:20:30. The bag was heat-sealed while the pressure inside the bag was reduced, so that a nonaqueous secondary battery 1 was produced. The nonaqueous secondary battery 1 had a design capacity of 20.5 mAh. The mixed solvent had a relative dielectric constant of 18.8.

<Measurement of Physical Properties of Nonaqueous Electrolyte Secondary Battery>

The rate characteristic (%) of the nonaqueous secondary battery 1 produced was measured by the above method for rate characteristic measurement. Table 3 shows the results.

A calculation was made of the proportion of (i) the relative dielectric constant of the nonaqueous electrolyte secondary battery separator of the nonaqueous secondary battery 1 to (ii) the relative dielectric constant of the mixed solvent (EMC:DEC:EC=50:20:30 [volume ratio]) of the nonaqueous secondary battery 1. Table 4 shows the results.

Example 2

Operations similar to those of Example 1 were carried out except that Aluminiumoxid/Titandioxid ($Al_2O_3$:$TiO_2$=99:1, solid solution) produced by ceram GmbH was replaced as fine metal oxide particles with Aluminiumoxid/Titandioxid ($Al_2O_3:TiO_2=85:15$, solid solution) produced by ceram GmbH.

The operations produced a laminated porous film 2, a nonaqueous electrolyte secondary battery member 2, and a nonaqueous secondary battery 2. Further, methods similar to those used in Example 1 were used to measure the physical properties of the three products. Tables 3 and 4 show the results. The laminated separator measured had a thickness $d_0=0.0189\times10^{-3}$ (m). The insulating porous layer had a thickness $d_1=0.0079\times10^{-3}$ (m). The porous film had a thickness $d_2=0.011\times10^{-3}$ (m).

Example 3

Operations similar to those of Example 1 were carried out except that Aluminiumoxid/Titandioxid ($Al_2O_3:TiO_2=99:1$, solid solution) produced by ceram GmbH was replaced as fine metal oxide particles with Aluminiumoxid/Titandioxid ($Al_2O_3:TiO_2=60:40$, solid solution) produced by ceram GmbH. The operations produced a laminated porous film 3, a nonaqueous electrolyte secondary battery member 3, and a nonaqueous secondary battery 3. Further, methods similar to those used in Example 1 were used to measure the physical properties of the three products. Tables 3 and 4 show the results. The laminated separator measured had a thickness $d_0=0.0184\times10^{-3}$ (m). The insulating porous layer had a thickness $d_1=0.0074\times10^{-3}$ (m). The porous film had a thickness $d_2=0.011\times10^{-3}$ (m).

Example 4

Operations similar to those of Example 1 were carried out except that Aluminiumoxid/Titandioxid ($Al_2O_3:TiO_2=99:1$, solid solution) produced by ceram GmbH was replaced as fine metal oxide particles with fine metal oxide particles prepared by mixing, in a mortar, barium titanate (produced by Nacalai Tesque) with Aluminiumoxid/Titandioxid ($Al_2O_3:TiO_2=60:40$, solid solution) produced by ceram GmbH, which was used in Example 3, so that the weight ratio was ($Al_2O_3:TiO_2$):barium titanate=99.9:0.1. The operations produced a laminated porous film 4, a nonaqueous electrolyte secondary battery member 4, and a nonaqueous secondary battery 4. Further, methods similar to those used in Example 1 were used to measure the physical properties of the three products. Tables 3 and 4 show the results. The laminated separator measured had a thickness $d_0=0.0196\times10^{-3}$ (m). The insulating porous layer had a thickness $d_1=0.0086\times10^{-3}$ (m). The porous film had a thickness $d_2=0.011\times10^{-3}$ (m).

Comparative Example 1

Operations similar to those of Example 1 were carried out except that Aluminiumoxid/Titandioxid ($Al_2O_3:TiO_2=99:1$, solid solution) produced by ceram GmbH was replaced as fine metal oxide particles with magnesium oxide (produced by Kyowa Chemical Industry Co., Ltd.; product name: Pyrokisuma [registered trademark] 500-04R). The operations produced a laminated porous film 5, a nonaqueous electrolyte secondary battery member 5, and a nonaqueous secondary battery 5. Further, methods similar to those used in Example 1 were used to measure the physical properties of the three products. Tables 3 and 4 show the results. The laminated separator measured had a thickness $d_0=0.0237\times10^{-3}$ (m). The insulating porous layer had a thickness $d_1=0.0127\times10^{-3}$ (m). The porous film had a thickness $d_2=0.011\times10^{-3}$ (m).

Comparative Example 2

Operations similar to those of Example 1 were carried out except that Aluminiumoxid/Titandioxid ($Al_2O_3:TiO_2=99:1$, solid solution) produced by ceram GmbH was replaced as fine metal oxide particles with high purity alumina (produced by Sumitomo Chemical Co., Ltd.; product name: AA-03; with a purity of not less than 99.99%). The operations produced a laminated porous film 6, a nonaqueous electrolyte secondary battery member 6, and a nonaqueous secondary battery 6. Further, methods similar to those used in Example 1 were used to measure the physical properties of the three products. Tables 3 and 4 show the results. The laminated separator measured had a thickness $d_0=0.0207\times10^{-3}$ (m). The insulating porous layer had a thickness $d_1=0.0097\times10^{-3}$ (m). The porous film had a thickness $d_2=0.011\times10^{-3}$ (m).

Comparative Example 3

Operations similar to those of Example 1 were carried out except that Aluminiumoxid/Titandioxid ($Al_2O_3:TiO_2=99:1$, solid solution) produced by ceram GmbH was replaced as fine metal oxide particles with barium titanate (produced by Nacalai Tesque). The operations produced a laminated porous film 7, a nonaqueous electrolyte secondary battery member 7, and a nonaqueous secondary battery 7. Further, methods similar to those used in Example 1 were used to measure the physical properties of the three products. Tables 3 and 4 show the results. The laminated separator measured had a thickness $d_0=0.0204\times10^{-3}$ (m). The insulating porous layer had a thickness $d_1=0.0084\times10^{-3}$ (m). The porous film had a thickness $d_2=0.012\times10^{-3}$ (m).

TABLE 3

| | | Laminated porous film | | Peeled base material: A layer | Coating layer: B layer Capacitance of | Rate |
|---|---|---|---|---|---|---|
| | Filler kind | Relative dielectric constant $\varepsilon r_0$ | Capacitance $C_0$ $\varepsilon r_0 *\varepsilon *S/d_0$ [nF] | Capacitance $C_2$ $\varepsilon r_2 *\varepsilon *S/d_2$ [nF] | coating layer only $C_1$ $\varepsilon r_1 *\varepsilon *S/d_1$ [nF] | characteristic 20 C/0.2 C (%) |
| Example 1 | $Al_2O_3:TiO_2 = $ 99:1 | 1.73 | 0.0162 | 0.0270 | 0.0407 | 46 |
| Example 2 | $Al_2O_3:TiO_2 = $ 85:15 | 1.84 | 0.0169 | 0.0267 | 0.0461 | 49 |
| Example 3 | $Al_2O_3:TiO_2 = $ 60:40 | 2.37 | 0.0224 | 0.0270 | 0.1304 | 53 |
| Example 4 | $BaTiO_3$:gray alumina = (60:40)) = 99.9:0.1 | 2.54 | 0.0225 | 0.0268 | 0.1415 | 75 |

TABLE 3-continued

| | | Laminated porous film | | Peeled base material: A layer | Coating layer: B layer Capacitance of | Rate |
|---|---|---|---|---|---|---|
| | Filler kind | Relative dielectric constant $\varepsilon r_0$ | Capacitance $C_0$ $\varepsilon r_0 * \varepsilon * S/d_0$ [nF] | Capacitance $C_2$ $\varepsilon r_2 * \varepsilon * S/d_2$ [nF] | coating layer only $C_1$ $\varepsilon r_1 * \varepsilon * S/d_1$ [nF] | characteristic 20 C/0.2 C (%) |
| Comparative Example 1 | MgO | 1.61 | 0.0118 | 0.0221 | 0.0253 | 7 |
| Comparative Example 2 | $Al_2O_3$ | 1.70 | 0.0143 | 0.0226 | 0.0387 | 32 |
| Comparative Example 3 | $BaTiO_3$ | 2.63 | 0.0231 | 0.0275 | 0.1431 | 19 |

TABLE 4

| | Relative dielectric constant of laminated porous film ($\varepsilon r$) | vs EC | vs DEC | vs EMC | vs DMC | vs mixed solvent (EC/EMC/DEC) |
|---|---|---|---|---|---|---|
| Example 1 | 1.73 | 0.0193 | 0.613 | 0.597 | 0.558 | 0.0920 |
| Example 2 | 1.84 | 0.0205 | 0.652 | 0.634 | 0.594 | 0.0979 |
| Example 3 | 2.37 | 0.0264 | 0.840 | 0.817 | 0.765 | 0.126 |
| Example 4 | 2.54 | 0.0283 | 0.901 | 0.876 | 0.819 | 0.135 |
| Comparative Example 1 | 1.61 | 0.0179 | 0.571 | 0.555 | 0.519 | 0.0856 |
| Comparative Example 2 | 1.7 | 0.0189 | 0.603 | 0.586 | 0.548 | 0.0904 |
| Comparative Example 3 | 2.63 | 0.0293 | 0.933 | 0.907 | 0.848 | 0.1400 |

<Mixed solvent> Ethylene carbonate:diethyl carbonate:ethyl methyl carbonate = 30:20:50 (volume ratio)

CONCLUSION

Tables 3 and 4 show that the nonaqueous electrolyte secondary battery laminated separators produced in the Examples, each of which had (i) a capacitance of not less than 0.0145 nF and not more than 0.0230 nF per 19.6 mm² and (ii) a relative dielectric constant of more than 1.70 and not more than 2.60 per 19.6 mm², each allowed a battery including the nonaqueous electrolyte secondary battery laminated separator to have an improved rate characteristic over the nonaqueous electrolyte secondary battery laminated separators produced in the Comparative Examples, each of which had a capacitance and a relative dielectric constant each outside the above range.

Tables 3 and 4 show that in each of the nonaqueous electrolyte secondary battery laminated separators produced in the Examples above, the porous film had a capacitance within a range of not less than 0.0230 nF and not more than 0.0270 nF per 19.6 mm². Tables 3 and 4 also show that in each of the nonaqueous electrolyte secondary batteries produced in the Examples above, the nonaqueous electrolyte secondary battery laminated separator had a relative dielectric constant having a proportion of not less than 0.0190 and not more than 0.930 with respect to the relative dielectric constant of the electrolyte solution solvent.

Tables 3 and 4 show that in each of the nonaqueous electrolyte secondary battery laminated separators produced in the Examples above, the insulating porous layer had a capacitance of not less than 0.0390 nF and not more than 0.0142 nF per 19.6 mm². The nonaqueous electrolyte secondary battery laminated separators each presumably improve the rate characteristic of the battery through moderate acceleration of desolvation of lithium ions (charge carrier) near the cathode, that is, inside the insulating porous layer. Thus, even in a case where an insulating porous layer having a capacitance of not less than 0.0390 nF and not more than 0.0142 nF per 19.6 mm² is used alone as a nonaqueous electrolyte secondary battery separator, a nonaqueous electrolyte secondary battery including the nonaqueous electrolyte secondary battery separator integrated therein should cause desolvation of cations (lithium ions) near the cathode to progress at a rate close to the rate of progress for any of the nonaqueous electrolyte secondary batteries produced in the Examples. It follows that a nonaqueous electrolyte secondary battery insulating porous layer having a capacitance of not less than not less than 0.0390 nF and not more than 0.0142 nF per 19.6 mm² should also allow a nonaqueous electrolyte secondary battery including the nonaqueous electrolyte secondary battery insulating porous layer integrated therein as a separator to have an improved output characteristic.

INDUSTRIAL APPLICABILITY

The nonaqueous electrolyte secondary battery insulating porous layer, the nonaqueous electrolyte secondary battery laminated separator, and the nonaqueous electrolyte secondary battery member of an embodiment of the present invention are usable in production of a nonaqueous electrolyte secondary battery having an excellent output characteristic.

The invention claimed is:
1. An insulating porous layer for a nonaqueous electrolyte secondary battery, the insulating porous layer comprising:
a fine metal oxide particle made of a titanium oxide and alumina, the insulating porous layer having a capacitance of not less than 0.0390 nF and not more than 0.142 nF per 19.6 mm$^2$ and a thickness of not less than 0.1 μm and not more than 20 μm, the insulating porous layer comprising pores having a pore size of not more than 3 μm.

2. The insulating porous layer according to claim 1, wherein
the fine metal oxide particle contains a metal oxide in a form of a solid solution.

3. The insulating porous layer according to claim 1, wherein
the fine metal oxide particle is a ground product.

4. The insulating porous layer according to claim 1, wherein
the fine metal oxide particle contains two or more kinds of metal oxides.

5. A laminated separator for a nonaqueous electrolyte secondary battery, the laminated separator comprising:
a porous film containing a polyolefin at a proportion of not less than 50% by volume; and
an insulating porous layer containing a fine metal oxide particle made of a titanium oxide and alumina and disposed on one or both surfaces of the porous film,
the insulating porous layer having a thickness of not less than 0.1 μm and not more than 20 μm,
the porous film having a thickness of not less than 4 μm and not more than 50 μm,
the laminated separator having a capacitance of not less than 0.0145 nF and not more than 0.0230 nF per 19.6 mm$^2$,
the insulating porous layer comprising pores having a pore size of not more than 3 μm.

6. The laminated separator according to claim 5, wherein
the laminated separator has a relative dielectric constant of more than 1.70 and not more than 2.60.

7. The laminated separator according to claim 5, wherein
the porous film has a capacitance of not less than 0.0230 nF and not more than 0.0270 nF per 19.6 mm$^2$.

8. The laminated separator according to claim 5, wherein
the fine metal oxide particle contains a metal oxide in a form of a solid solution.

9. The laminated separator according to claim 5, wherein
the fine metal oxide particle is a ground product.

10. The laminated separator according to claim 5, wherein
the fine metal oxide particle contains two or more kinds of metal oxides.

11. A nonaqueous electrolyte secondary battery member, comprising:
a cathode;
an insulating porous layer according to claim 1; and
an anode,
the cathode, the insulating porous layer, and the anode being arranged in that order.

12. A nonaqueous electrolyte secondary battery member, comprising:
a cathode;
a laminated separator according to claim 5; and
an anode,
the cathode, the laminated separator, and the anode being arranged in that order.

13. A nonaqueous electrolyte secondary battery, comprising:
a laminated separator according to claim 5; and
an electrolyte solution solvent,
the laminated separator having a relative dielectric constant having a proportion of not less than 0.0190 and not more than 0.930 with respect to a relative dielectric constant of the electrolyte solution solvent.

14. A nonaqueous electrolyte secondary battery, comprising:
an insulating porous layer according to claim 1.

15. A nonaqueous electrolyte secondary battery, comprising:
a laminated separator according to claim 5.

* * * * *